This invention relates to a method for producing large volumes of hot gases in a short period of time, which large volumes of hot gases are useful for many purposes including imparting thrust to jet propelled devices such as rockets.

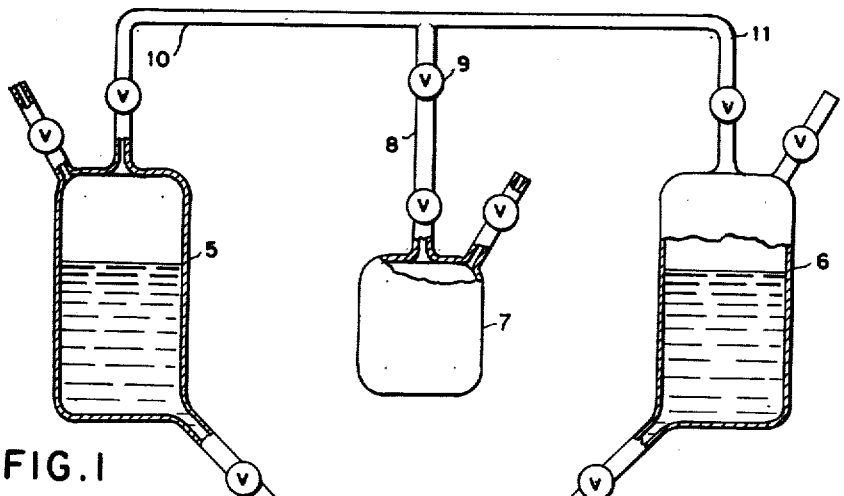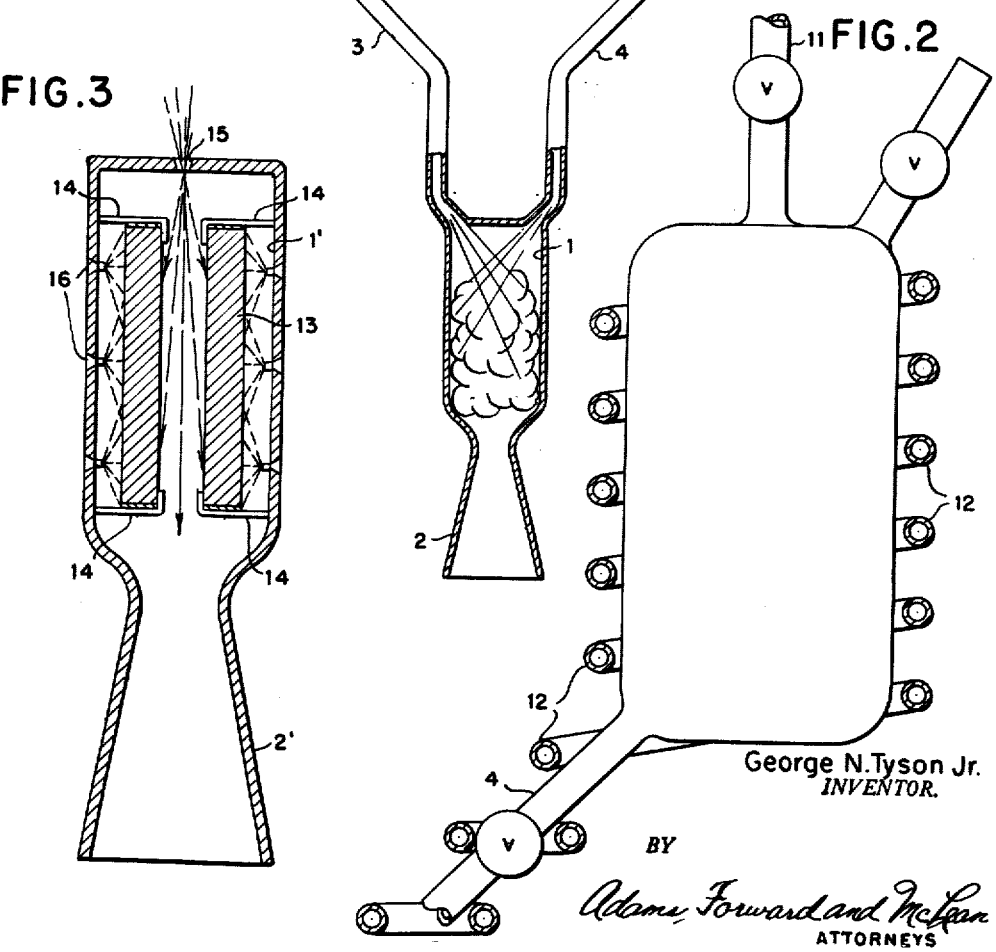
FIG.1
FIG.2
FIG.3
George N. Tyson Jr.
INVENTOR.
BY
Adams, Forward and McLean
ATTORNEYS 3,093,960
METHOD OF PRODUCING THRUST BY REACTING A METAL AZIDE WITH A BORON AND HYDROGEN CONTAINING COMPOUND
George N. Tyson, Jr., Claremont, Calif., assignor to Olin Mathieson Chemical Corporation, a corporation of Virginia
Filed Apr. 20, 1959, Ser. No. 807,713
12 Claims. (Cl. 60—35.4)

Jet propelled devices are essentially of two types: those which depend upon an external source for a portion of the propellant, and those in which the propellant is entirely contained within the device. Such latter devices are conventionally called pure rockets. This invention will be further described in relation to pure rockets and their operation.

One of the most important characteristics of a rocket propellant system is its performance index or specific impulse. This is the amount of thrust in pounds than can be obtained per pound of propellant consumed per second. Since the aim is to get as much thrust as possible per pound of propellant burned, a high value for the specific impulse is desirable.

Rocket propellants can be in the form of solids or in the form of liquids. Propellants consisting of a single liquid are termed monopropellants and include hydrogen peroxide and nitromethane. Propellants involving two liquids are termed bipropellants and normally consist of a fuel, such as a hydrocarbon, ethyl alcohol-water or ammonia and an oxidizer such as hydrogen peroxide or liquid oxygen. Other oxidizer fuel combinations include nitric acid with aniline or furfuryl alcohol. These latter combinations are termed hypergolic bipropellants since they react spontaneously upon admixture.

Hydrazine has also been used as a fuel component in bipropellant systems in combination with oxidizers such as liquid oxygen, hydrogen peroxide, white or red fuming nitric acid, or liquid fluorine. It is spontaneously inflammable with nitric acid and with fluorine. The specific impulse of hydrazine when burned with liquid oxygen varies from 257 to 264 pound-seconds per pound at 300 p.s.i.a. for various fuel-oxygen ratios, the value being higher in the presence of excess fuel, and when fluorine is used as the oxidizer, the specific impulse at 300 p.s.i.a. is about 298 pound-seconds per pound.

It has been proposed to employ the boron hydrides including diborane, tetraborane and the pentaboranes as fuel components in bipropellant systems wherein liquid oxygen is the oxidizer. Such systems supply high calculated specific impulses of about 290 pound-seconds per pound at 300 p.s.i.a.

The metal azides such as lead azide and silver azide have been used as initiators or detonators for explosives.

It has now been discovered that, surprisingly, the light metal azides react with the boron hydrides and borohydrocarbons. Moreover, it has been found that the reaction produces a very high specific impulse, of the order of 300 pound-seconds per pound at 300 p.s.i.a.

Thus large volumes of hot gases are produced according to the present invention by contacting a metal azide of the class $$M[H_x(N_3)_y]_z$$

wherein M is an alkali metal, an alkaline earth metal, magnesium, beryllium, gallium or aluminum, $x$ is 0 to 2, $y$ is 1 to 3, and $x+y=1$ to $3=z$, the valence of the metal M; or of the class $$M[BH_a(N_3)_b]_c$$

wherein M has the previous significance, $a$, is 0 to 3, $b$ is 1 to 4, $a+b=4$, and $c$ is 1 to 3, the valence of the metal M; or of the class $$M[AlH_a(N_3)_b]_c$$

wherein M, $a$, $b$, $c$ and $a+b$ have the previous significance, or the class;

$$M[GaH_a(N_3)_b]_c$$

wherein M, $a$, $b$, $c$ and $a+b$ have the previous significance, with a boron containing compound also containing hydrogen and being composed only of boron, hydrogen and carbon. The metal azide and the boron containing compound are reacted in such proportions that all of the nitrogen and all of the boron can react to produce nitride, the carbon, if present, is released as elemental carbon, the metals other than boron are released as the free metals, and large volumes of hydrogen gas are produced.

The metal azides include sodium, potassium and lithium azides, calcium, barium, magnesium and beryllium azides, aluminum and gallium azides, sodium, potassium and lithium boroazides and borohydridoazides, calcium, barium, magnesium and beryllium boroazides and borohydridoazides, aluminum and gallium boroazides and borohydridoazides, sodium, potassium and lithium aluminoazides and aluminohydridoazides, calcium, magnesium and beryllium aluminoazides and aluminohydridoazides, sodium, potassium and lithium galloazides and gallohydridoazides, calcium, magnesium galloazides and gallohydridoazides, and aluminum galloazide and aluminum gallohydridoazides. The alkali metal and alkaline earth metal azides can be prepared by conventional methods such as reaction of alkali metal or alkaline earth metal hydrides, chlorides or sulfates with hydrazoic acid. Magnesium, beryllium, aluminum and gallium azides can be prepared by reaction of the corresponding hydrides with hydrazoic acid generally according to the procedures described by E. Wiberg and H. Michand in "Z. Naturforsch" vol. 9b, pages 495–503 (1954). The boroazides and borohydridoazides, the aluminoazides and aluminohydridoazides, and the galloazides and gallohydridoazides can also be prepared by reaction of the corresponding metal borohydrides, metal aluminum hydrides and metal gallium hydrides with hydrazoic acid generally according to the procedures described by Wiberg and Michand in the above publication.

The hydridoazides can be prepared by employing less than the stoichiometric amount of hydrazoic acid. Another metal azide which can be employed is that obtained by reacting hydrazoic acid with $Al_2B_4H_{18}$. The latter compound is formed together with diborane by moderate heating of aluminum borohydride as described by R. A. Ogg. Jr. and J. D. Ray in "Discussions of the Farraday Society." No. 19, 239–46 (1955). Mixtures of the above metal azides can be employed as can pumpable slurries of the metal azides in, for example, a hydrocarbon such as benzene.

Boron containing compounds which can be employed as reactants include boron hydrides such as diborane, tetraborane, pentaborane-9 ($B_5H_9$), dihydropentaborane ($B_5H_{11}$), decaborane; alkyl boranes such as trimethyl borane, triethylborane and diethyl methyl borane; the reaction products of diborane with ethylene disclosed in application Serial No. 540,140, filed October 12, 1955, of Weilmuenster et al.; the reaction products of diborane with acetylene disclosed in application Serial No. 514,122, filed June 8, 1955 of Stange et al.; the reaction products of diborane with 3 to 5 carbon atom acetylenes or dienes disclosed in application Serial No. 533,944, filed September 13, 1955 of Weilmuenster et al.; monoethyltetraborane disclosed in application Serial No. 505,706, filed May 3, 1955 of Faust et al.; monalkyl pentaboranes such as monomethylpentaborane-9, monoethylpentaborane-9, mono-n-propylpentaborane-9 disclosed in application Serial No. 497,408, filed March 28, 1955, now U.S. Patent No. 3,038,012, of Altwicker et al., and application Serial No. 501,742, filed April 15, 1955 of Chiras et al.; dialkylpentaboranes such as diethylpentaborane-9 disclosed in application Serial No. 540,145, filed October 12, 1955, now abandoned, of Paustian et al.; the mono-di- and trialkyldecaboranes such as monomethyldecaborane, dimethyldecaborane, ethyldecaborane, diethyldecaborane, triethyldecaborane disclosed in application Serial No. 497,407, filed March 28, 1955, now U.S. Patent No. 2,999,117, of Altwicker et al.; reaction products of acetylenic hydrocarbons with decaborane and alkyldecaboranes such as those disclosed in application Serial No. 741,976, filed June 13, 1958, now abandoned, of Ager, Jr. et al. and application Serial No. 779,788, filed December 11, 1958 of Clark et al. Mixtures of the above boron containing compounds can also be employed as can solutions of the solid compounds in the liquid compounds.

The metal azides and the boron containing compounds described above react to produce very finely divided solid boron nitride, very finely divided carbon, free metals other than boron, and large volumes of hydrogen gas. The following are representative equations illustrative of the reactions which take place:

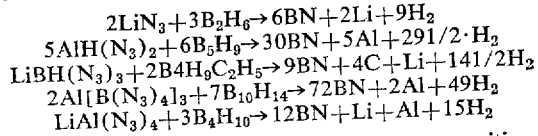

Some of the above azide compounds are sensitive to percussion and pressure so that care must be used in their handling.

The operation of a rocket engine employing a bipropellant consisting of a metal azide and a boron containing compound will be described with reference to the accompanying drawing, which depicts schematically in FIGURES 1 and 2 a conventional rocket engine employing liquid bipropellants and in FIGURE 3 an engine employing liquid and solid components of a bipropellant.

In FIGURE 1 of the drawing, numeral 1 represents the reaction chamber and numeral 2 the nozzle of the rocket engine. Chamber 2 is connected by valved lines 3 and 4 to vented tanks 5 and 6 respectively which contain respectively lithium azide slurried in benzene and pentaborane-9 as the propellants. Tank 7 contains, for example, a compressed inert gas such as nitrogen and is connected by line 8, containing pressure regulator 9, and branched, valved lines 10 and 11 respectively in tanks 5 and 6. Reaction chamber 1 is generally quite small in comparison with the size of the propellant tanks 5 and 6. The pressure in reaction chamber 1 during the reaction can be controlled by the rate of addition of the propellants and is generally in the range of 300–1000 p.s.i.a. The propellants are forced into reaction chamber 1 against this pressure and the compressed inert gas from tank 7 is employed to apply pressure to tanks 5 and 6. Instead of a compressed inert gas, pumps can be used for this purpose and on larger devices turbopumps can be employed driven by turbines supplied with hot gases from a separate gas generator.

The propellants enter reaction chamber 1 through an injector which can be of the impinging stream, multiple hole type, with or without a splash plate, or of the spray type. In the former, the propellants are separately injected through a number of separate holes in such a manner that the resulting propellant streams intersect each other and both will break up into small droplets. Spray type injectors give conical, cylindrical, or other types of spray sheets of propellant fluids, which intersect and thereby atomize and mix.

In some instances, the bipropellant system is hypergolic so that igniting means are not required. To facilitate start-up, however, a glow plug, spark plug or flame lance can be provided. Such igniting means are also provided where the system is not hypergolic.

Since it is almost impossible to synchronize exactly the propellant feed of a bipropellant system when starting the rocket engine, the boron containing compound flow is advantageously first initiated. The propellant valves can be controlled to operate in sequence and only partially opened until reaction is established at which time they are fully opened. After start-up, the flow ratio of metal azide to boron containing compound is adjusted to be approximately stoichiometric for the reaction of all of the boron in the latter with all of the nitrogen in the former to form boron nitride, BN.

Liquid propellants mostly are reacted in the temperature range of 2000° F. to 4500° F. at pressures between 300 and 1500 p.s.i.a. The reaction pressure, as stated previously, can be controlled by the rate of flow of the propellants. The metal azides and the boron containing compounds described above react at relatively high temperatures of 4500° to 5000° F. at these pressures. For rocket engines designed for relatively long periods of sustained operating duration, the engine can be cooled, for example by a regenerative cooling system using one of the bipropellant fuel elements or another relatively inert fluid as the coolant flowing through a jacket surrounding the reaction chamber.

FIGURE 2 of the drawing shows a modification of FIGURE 1 wherein tank 6 and line 4 are surrounded by heating coil 12. The modification shown in FIGURE 2 permits the use of low melting point solid boranes such as decaborane in liquid bipropellant systems.

FIGURE 3 of the drawing shows a hybrid liquid-solid bipropellant system. In this system, numeral 1' represents the reaction chamber and numeral 2' the nozzle of the rocket engine. In chamber 1' there is a cored solid propellant component 13, which can be, for example, lithium azide suspended by holding device 14. The solid propellant component can have its ends coated with an inhibitor. The liquid propellant component, which can be for example, pentaborane-9, enters through injector 15 so as to contact the internal surface of the cored solid propellant and through injectors 16 so as to contact the external surface of the cored solid propellant.

I claim:
1. A method for producing large volumes of hot gases which comprises reacting in a reaction zone at a temperature of at least about 2000° F. a mixture consisting essentially of a metal azide with a boron and hydrogen containing compound selected from the class consisting of boron hydrides and hydrocarbon substituted boron hydrides in a ratio approximately stoichiometric for the reaction of all of the nitrogen in the metal azide with all of the boron in the boron and hydrogen containing compound to form boron nitride, BN, the metal azide being selected from the group consisting of

$$M[H_x(N_3)_y]_z$$

wherein M is selected from the class consisting of an alkali metal, an alkaline earth metal, magnesium, beryllium, gallium and aluminum, $x$ is 0 to 2, $y$ is 1 to 3, and $x+y=1$ to $3=z$, the valence of the metal M;

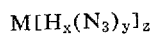

wherein M has the previous significance, $a$ is 0 to 3, $b$ is 1 to 4, $a+b=4$, and $c$ is 1 to 3, the valence of the metal M;

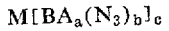

wherein M, $a$, $b$, $c$ and $a+b$ have the previous significance, and

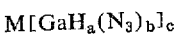

wherein M, a, b, c and a+b have the previous significance.

2. The method of claim 1 wherein the metal azide is composed only of metal and nitrogen.

3. The method of claim 1 wherein the metal azide is lithium azide and the boron and hydrogen containing compound is pentaborane-9.

4. The method of claim 1 wherein the metal azide is lithium boroazide and the boron and hydrogen containing compound is pentaborane-9.

5. The method of claim 1 wherein the metal azide is aluminum boroazide and the boron and hydrogen containing compound is methyl decaborane.

6. The method of claim 1 wherein the metal azide is lithium aluminoazide and the boron and hydrogen containing compound is ethyl decaborane.

7. A method of operating a jet propelled device which comprises separately supplying to the reaction chamber of the device a metal azide and a boron and hydrogen containing compound selected from the class consisting of boron hydrides and hydrocarbon substituted boron hydrides, contacting the metal azide with the boron containing compound in a ratio approximately stoichiometric for the reaction of all of the nitrogen with all of the boron to form boron nitride, BN, and exhausting the resulting gases from said device so as to impart thrust thereto, the metal azide being selected from the group consisting of $$M[H_x(N_3)_y]_z$$

wherein M is selected from the class consisting of an alkali metal, an alkaline earth metal, magnesium, beryllium, gallium and aluminum, $x$ is 0 to 2, $y$ is 1 to 3, and $x+y=z$, the valence of the metal M;

$$M[BH_a(N_3)_b]_c$$

wherein M has the previous significance, $a$ is 0 to 3, $b$ is 1 to 4, $a+b=4$, and $c$ is 1 to 3, the valence of the metal M;

$$M[(AlH_a(N_3)_b]_c$$

wherein M, a, b, c and a+b have the previous significance, and $$M[GaH_a(N_3)_b]_c$$

wherein M, a, b, c, and a+b have the previous significance.

8. The method of claim 7 wherein the metal azide is composed only of metal and nitrogen.

9. The method of claim 7 wherein the metal azide is lithium azide and the boron and hydrogen containing compound is pentaborane-9.

10. The method of claim 7 wherein the metal azide is lithium boroazide and the boron and hydrogen containing compound is pentaborane-9.

11. The method of claim 7 wherein the metal azide is lithium aluminum boroazide and the boron and hydrogen containing compound is methyl decaborane.

12. The method of claim 7 wherein the metal azide is lithium aluminoazide and the boron and hydrogen containing compound is ethyl decaborane.

No references cited.

UNITED STATES PATENT OFFICE
CERTIFICATE OF CORRECTION

Patent No. 3,093,960                      June 18, 1963

George N. Tyson, Jr.

It is hereby certified that error appears in the above numbered patent requiring correction and that the said Letters Patent should read as corrected below.

Column 2, line 25, for "galium" read -- gallium --; column 3, line 55, for "in" read -- to --; column 4, line 67, for "$M[BA_a(N_3)_b]_c$" read -- $M[BH_a(N_3)_b]_c$ --; column 6, line 8, for "$M[(AlH_a(N_3)_b]_c$" read -- $M[AlH_a(N_3)_b]_c$ --.

Signed and sealed this 7th day of January 1964.

(SEAL)
Attest:
ERNEST W. SWIDER                    EDWIN L. REYNOLDS

Attesting Officer                   Acting Commissioner of Patents